(12) United States Patent
Deschamps

(10) Patent No.: US 10,147,924 B2
(45) Date of Patent: Dec. 4, 2018

(54) LITHIUM BATTERY PROTECTED FROM INTRUSION BY POINTED ELEMENTS

(75) Inventor: Marc Deschamps, Quimper (FR)

(73) Assignee: BLUE SOLUTIONS, Quimper (FR)

( * ) Notice: Subject to any disclaimer, the term of this patent is extended or adjusted under 35 U.S.C. 154(b) by 995 days.

(21) Appl. No.: 13/697,590

(22) PCT Filed: May 25, 2011

(86) PCT No.: PCT/FR2011/051190
§ 371 (c)(1),
(2), (4) Date: Jan. 22, 2013

(87) PCT Pub. No.: WO2011/148100
PCT Pub. Date: Dec. 1, 2011

(65) Prior Publication Data
US 2015/0311491 A1   Oct. 29, 2015

(30) Foreign Application Priority Data
May 27, 2010 (FR) ..................... 10 54057

(51) Int. Cl.
*H01M 2/16* (2006.01)
*H01M 10/0525* (2010.01)
*H01M 10/42* (2006.01)

(52) U.S. Cl.
CPC ..... *H01M 2/1653* (2013.01); *H01M 10/0525* (2013.01); *H01M 10/4235* (2013.01)

(58) Field of Classification Search
CPC ........... H01M 10/0418; H01M 10/044; H01M 10/0525; H01M 10/4235; H01M 2/1653
See application file for complete search history.

(56) References Cited

U.S. PATENT DOCUMENTS 7,279,248 B2 * 10/2007 Fukuzawa ............... H01M 2/08
429/185
7,320,846 B2 * 1/2008 Watanabe ............... H01M 2/08
29/623.2
(Continued)

FOREIGN PATENT DOCUMENTS

CN 101517787 8/2009
JP 60189867 * 9/1985
(Continued)

OTHER PUBLICATIONS

International Search Report dated Sep. 8, 2011.

*Primary Examiner* — Ula C Ruddock
*Assistant Examiner* — Thomas H. Parsons
(74) *Attorney, Agent, or Firm* — IPSILON USA, LLP

(57) ABSTRACT

The invention relates to a lithium battery, the operation of which is security-protected by the interposition of resilient films. The battery is made up of a battery cell PEN, which comprises a film of an electrolyte E containing a lithium salt between a film P forming a positive electrode and a film N forming a negative electrode, or made up of a stack of battery cells PEN, said stack comprising two terminal battery cells between which are optionally placed one or more intermediate battery cells, said battery being characterized in that it comprises at least two protective films Fp made of a resilient material, at least one of the electrodes of the battery cell or of each terminal battery cell being in contact with a protective film Fp made of a resilient material. In particular, at least two protective films Fp are made of a resilient material having an elongation at break denoted by $a_{me}$ and a thickness denoted by $e_{me}$, at least one of said protective films Fp in contact with a connection layer, for connecting an electrode, having a thickness $e_{max}$, said film having a thickness $e_{me}$ such that $e_{me} > e_{max}/a_{me}$. The invention relates to "lithium" batteries, the negative electrode of which is made (Continued)

of lithium metal, and to "lithium ion" batteries, the negative electrode of which comprises a lithium-ion insertion material.

20 Claims, 4 Drawing Sheets

(56) References Cited

U.S. PATENT DOCUMENTS

| | | | | |
|---|---|---|---|---|
| 8,124,266 B2* | 2/2012 | Yamazaki | ............... | H01G 9/016 |
| | | | | 429/120 |
| 8,603,680 B2* | 12/2013 | Affinito | ................... | H01M 4/02 |
| | | | | 429/145 |
| 2007/0025062 A1* | 2/2007 | Miyaki | .................. | H01G 9/016 |
| | | | | 361/502 |
| 2008/0241674 A1 | 10/2008 | Kim | | |
| 2008/0274398 A1* | 11/2008 | Kim | .................... | H01M 2/1666 |
| | | | | 429/129 |
| 2009/0208838 A1 | 8/2009 | Kim | | |

FOREIGN PATENT DOCUMENTS

| | | | |
|---|---|---|---|
| JP | 2000-21386 | | 1/2000 |
| JP | 2000021386 | * | 1/2000 |
| JP | 2002110239 | | 4/2002 |
| JP | 2007-188869 | | 7/2007 |
| JP | 2008-103310 | | 5/2008 |
| WO | 2005089383 | | 9/2005 |
| WO | 2005089390 | | 9/2005 |
| WO | WO2007145441 | * | 12/2007 |

\* cited by examiner

LITHIUM BATTERY PROTECTED FROM INTRUSION BY POINTED ELEMENTS

RELATED APPLICATIONS

This application is a National Phase Application of PCT/FR2011/051190, filed on May 25, 2011, which in turn claims the benefit of priority from French Patent Application No. 10 54057 filed on May 27, 2010, the entirety of which are incorporated herein by reference.

BACKGROUND

Field of the Invention

The present invention relates to a battery which operates by reversible circulation of lithium ions between the electrodes through the electrolyte, said battery having an improved operational safety.

Description of Related Art

A battery operating by circulation of lithium ions comprises at least one negative electrode and at least one positive electrode separated by an electrolyte. In said battery, the electrolyte comprises a lithium salt in solution in a liquid solvating solvent, a polymer solid solvent or a gel solvent in which the salt can be easily dissociated; the positive electrode consists of a current collector supporting an electrode material that contains at least one positive electrode active material capable of reversibly inserting lithium ions; the negative electrode consists of a sheet of lithium metal (optionally supported by a current collector), of a lithium alloy or of an intermetallic lithium compound (lithium battery), or by a current collector supporting an electrode material that contains at least one negative electrode active material capable of reversibly inserting lithium ions (lithium-ion battery).

Lithium or lithium-ion batteries may consist of a very large number of battery cells, each of the battery cells consisting of a film of negative electrode, a film of electrolyte and a film of positive electrode, said films in general having a thickness between 10 and 100 μm. These batteries are generally produced by assembling a certain number of battery cells in parallel by connecting together the positive electrodes to form a positive pole, and the negative electrodes to form a negative pole, then by assembling in series the groups of battery cells assembled in parallel, connecting the pole of one group to the pole of opposite sign of another group. By way of example, it is possible to envisage assembling a few hundred groups each comprising up to 100 battery cells.

Due to their formation in the form of thin films, these batteries are sensitive to crushing or to the penetration of pointed elements. During crushing or the penetration of a pointed element, a short-circuit may occur by direct contact between the current collectors, or between a current collector and the penetrating element if it is conductive. The short-circuit may cause a fire.

OBJECTS AND SUMMARY

The objective of the present invention is to provide a battery for which the operational safety during crushing or the penetration of pointed elements is improved, by preventing, during crushing of the battery, two successive electrodes of opposite sign from coming into contact and by preventing, during the penetration of a metallic element into one of the faces of the battery, said metallic element from coming into contact with two successive electrodes of opposite sign. This objective is achieved by affixing elastic films to at least some electrodes.

A battery according to the invention consists of a battery cell PEN which comprises a film of an electrolyte E containing a lithium salt between a film P forming a positive electrode and a film N forming a negative electrode, or of a stack of battery cells PEN comprising two terminal battery cells between which one or more intermediate battery cells are optionally placed. Said battery is characterized in that it comprises at least two protective films Fp consisting of an elastic material, at least one of the electrodes of the battery cell or of each terminal battery cell being in contact with a protective film Fp consisting of an elastic material.

In particular, the battery comprises at least two protective films Fp consisting of an elastic material having an elongation at break denoted by $a_{me}$ and a thickness denoted by $e_{me}$, at least one of said protective films Fp being in contact with a connection layer of an electrode having a thickness $e_{max}$, said film having a thickness $e_{me}$ such that $e_{me} > e_{max}/a_{me}$.

Thus, during the penetration of a pointed element through any one of the faces of the battery, the stretching of the protective film by the penetrating element prevents contact between the penetrating element and the electrodes.

Within the meaning of the present invention, the expressions "positive electrode" and "negative electrode" are understood to mean the assembly formed by an electrode layer and a current collector when the battery comprises such a collector. The connection layer is the layer of the electrode which ensures the connection of the electrode with an external electric circuit. Thus, when it is indicated that the protective film is in contact with a connection layer of an electrode, this means that the protective film is in contact with the electrode layer itself, when the electrode is devoid of a current collector, in particular when this layer is made of a metallic film, or with the current collector, when the electrode comprises such a collector.

In a battery according to the invention comprising a single battery cell PEN, at least one of the faces of each electrode is in contact with said protective film Fp.

In the present text, the expression "terminal battery cell" denotes a battery cell located on the outer face of a battery consisting of a stack of several battery cells, and the expression "intermediate battery cell" denotes a battery cell which is not a terminal battery cell in the stack. The expression "terminal electrode" denotes an electrode located on the outer face of a terminal battery cell. The two electrodes of a battery consisting of a single battery cell are considered to be terminal electrodes. The expression "outer face" of a terminal electrode denotes the face of said electrode which is on the opposite side from that which is facing an electrolyte film.

A film forming an electrode or an electrolyte in a battery according to the invention generally has a thickness varying from 10 μm to 100 μm. When the electrolyte is a liquid electrolyte, it impregnates a separator placed between a negative electrode and a positive electrode.

According to one preferred embodiment of the invention, the electrolyte is a solid electrolyte.

In a battery according to the invention, the number of battery cells may be very high. The battery cells are generally assembled in parallel, then the groups of battery cells assembled in parallel are assembled in series. In one assembly in parallel, each electrode of a battery cell is connected to the electrode of the same sign of an adjacent battery cell.

In an assembly in series, each electrode of a battery cell (or of a group of battery cells connected in parallel) is connected to the electrode of opposite sign of an adjacent battery cell (or of a group of battery cells connected in parallel). A battery according to the invention is preferably in the form of an assembly in series of a few hundred groups each comprising up to 100 battery cells mounted in parallel. It is thus possible to envisage 1 to 500 groups each consisting of 1 to 200 battery cells, more particularly from 10 to 400 groups each consisting of 5 to 150 battery cells.

In a battery according to the invention, a positive electrode consists of a current collector bearing a film of positive electrode active material capable of reversibly inserting lithium ions. In a battery known as a "lithium battery", the negative electrode consists of a film of a metallic material chosen from lithium, lithium alloys and intermetallic lithium compounds. In a battery known as a "lithium-ion battery", the negative electrode consists of a current collector bearing a film of negative electrode active material capable of reversibly inserting lithium ions.

When an electrode consists of a current collector bearing an active material, the protective film is placed between the current collector and the film of active material. In the case of an anode consisting of a metallic (lithium, lithium alloy, intermetallic lithium compound) film, the protective film is applied to said metallic film.

In one particularly preferred configuration of a battery consisting of a stack of multiple battery cells PEN, the battery cells are stacked so that:
- the positive electrodes of two adjacent battery cells are combined as one and are formed by a single current collector bearing a film of positive electrode active material on each of its faces;
- the negative electrodes of two adjacent battery cells are combined as one and are formed either by a single current collector bearing a film of negative electrode active material on each of its faces; or by a film of a metallic material chosen from lithium, lithium alloys and intermetallic lithium compounds;
- a positive terminal electrode consists of a current collector bearing a positive electrode active material on one of its faces;
- a negative terminal electrode consists either of a current collector bearing a negative electrode active material on one of its faces, or of a film of a metallic material chosen from lithium, lithium alloys and intermetallic lithium compounds.

When a battery according to the invention comprises only protective films Fp on one of the faces of each of the terminal electrodes, the elastic material forming the protective films preferably has an elongation at break $a_{me}$ and a thickness $e_{me}$ such that $e_{me} \geq e_{max\text{-}Tot}/a_{me}$, $e_{max\text{-}Tot}$ being the thickness of the battery cells between said protective films Fp.

When a battery according to the invention comprises multiple battery cells, the interposition of several protective films in the intermediate battery cells enables the use of a material for which the elasticity may be lower than in the case where the battery comprises only one protective film on each of the two terminal electrodes. This result may be obtained according to several variants.

A first variant for protection of a battery, known as the minimal variant, aims to prevent contact between electrodes of opposite sign, directly or by means of a penetrating pointed element.

A second variant for protection of a battery, known as the optimal variant, aims to prevent contact between all the electrodes, directly or by means of a penetrating pointed element.

In a lithium-ion battery, the objective is to prevent contact between a penetrating element and the current collectors of the electrodes.

The minimal variant for protection in a lithium-ion battery may be implemented according to two embodiments.

In a first embodiment, a protective film is placed on each face of the current collector of each electrode of a given sign, for example on each face of the current collectors of the positive electrodes when the terminal electrodes are positive electrodes, choosing a film material and thickness such that $e_{me} \geq e_{max}/a_{me}$, $e_{max}$ being at least equal to the thickness of a current collector. During the penetration of a conductive pointed element through any one of the faces of the battery, the conductive element stretches each protective film so as to mask the edge of the film forming the current collector placed downstream of the protective film, "downstream" being understood with respect to the direction of penetration of a conductive pointed element. The penetrating element is thus insulated from the positive current collectors, so that it does not form a connection between collectors of opposite sign. Of course, the result would be analogous if the terminal electrodes were negative electrodes, the protective films then being affixed to the current collectors of the negative electrodes.

In a second embodiment, a protective film is placed on the upstream face of the positive current collectors, and on the downstream face of the negative current collectors, "upstream" and "downstream" being understood with respect to the direction of penetration of a conductive pointed element, by choosing a film material and thickness such that $e_{me} \geq e_{max}/a_{me}$, $e_{max}$ being at least equal to the thickness of a current collector. When an element penetrates through the upstream face of the positive current collectors, it stretches the protective film of these current collectors so as to mask the edge of the positive current collectors downstream of the protective film, and it stretches the protective film associated with the negative current collectors. When an element penetrates through the opposite face of the battery, it stretches the protective film of the negative current collectors so as to mask the edge of the negative current collectors downstream of the protective films, and it also stretches the films associated with the positive collectors.

The optimal variant in a lithium-ion battery may be implemented according to various embodiments.

In a first embodiment, a protective film is affixed to at least one of the faces of the current collector of each terminal electrode, by choosing a film material and thickness such that $e_{me} \geq e_{max\text{-}Tot}/a_{me}$, $e_{max\text{-}Tot}$ being at least equal to the thickness of all of the superposed battery cells.

In a second embodiment, a protective film is placed on each face of the current collector of each electrode of a given sign, for example on each face of the current collectors of the positive electrodes, choosing a film material and thickness such that $e_{me} \geq e_{max\text{-}Tot}/a_{me}$, $e_{max\text{-}Tot}$ being at least equal to the thickness of a battery cell. During the penetration of a conductive pointed element through any one of the faces of the battery, the conductive element stretches each protective film so as to mask the edge of the films forming a battery cell, including the edge of the two successive current collectors of opposite sign. The penetrating element is thus insulated from all the current collectors. Of course, the result would be analogous if the protective films were affixed to the current collectors of the negative electrodes.

In a third embodiment, a protective film is placed on the upstream face of the positive current collectors, and on the downstream face of the negative current collectors, "upstream" and "downstream" being understood with respect to the direction of penetration of a conductive pointed element, by choosing a film material and thickness such that $e_{me} \geq e_{max\text{-}Tot}/a_{me}$, $e_{max\text{-}Tot}$ being at least equal to the thickness of a battery cell. When a pointed element penetrates through the upstream face of the positive current collectors, it stretches the protective film of these current collectors so as to mask the edge of the films forming a battery cell, including the edge of the two successive current collectors of opposite sign, and it stretches the protective film associated with the negative current collectors. When an element penetrates through the opposite face of the battery, it stretches the protective film of the negative current collectors so as to mask the edge of the films forming a battery cell, including the edge of the two successive current collectors of opposite sign, and it also stretches the films associated with the positive collectors.

In a lithium battery, the objective is to prevent contact between a penetrating element, the current collector of the positive electrodes and the metallic film forming the negative electrodes. During the penetration of a pointed element, the metallic material forming a negative electrode may flow to a greater or lesser extent depending on its degree of ductility. The flow will be greater for a lithium film than for a film of a lithium alloy.

In the minimal variant for protection of a lithium battery, the objective of the protective films is to prevent contact between a conductive penetrating element and the current collectors of the positive electrodes and the metallic (lithium, lithium alloy, intermetallic lithium compound) films forming the negative electrodes, taking into account the possible flow of these metallic films during the penetration of a pointed element. This variant may be implemented according to various embodiments.

In a first embodiment, a protective film is placed on each face of the current collector of each positive electrode, by choosing a film material and thickness such that $e_{me} \geq e_{max}/a_{me}$, $e_{max}$ being at least equal to the thickness of a current collector of the positive electrode. During the penetration of a conductive pointed element to any one of the faces of the battery, the conductive element stretches each protective film so as to mask the edge of the film forming the positive current collector placed after the protected film. The penetrating element is thus insulated from the positive current collectors, so that it does not form a connection between collectors of opposite sign.

In a second embodiment, a protective film is placed on each face of each negative electrode, by choosing a film material and thickness such that $e_{me} \geq e_{max}/a_{me}$, $e_{max}$ being at least equal to the thickness of the negative electrode taking into account the possible flow of the material forming this negative electrode, or to the thickness of the electrolyte and of the positive electrode which are placed after the protective film.

In a third embodiment, a protective film is placed on the upstream face of the positive current collectors, and on the downstream face of the negative electrodes, "upstream" and "downstream" being understood with respect to the direction of penetration of a conductive pointed element, by choosing a film material and thickness such that $e_{me} \geq e_{max}/a_{me}$, $e_{max}$ being at least equal to the largest thickness among the thickness of a current collector and the thickness of the negative electrode taking into account the possible flow of the material which forms it.

Optimal Protection

In the optimal variant for protection of a lithium battery, the objective of the protective films is to prevent contact between a conductive penetrating element, the current collectors of the positive electrodes and the metallic films forming the negative electrodes. This variant may be implemented according to various embodiments.

When the terminal electrodes are negative electrodes, a protective film is affixed to the outer face of each terminal electrode, by choosing a film material and thickness such that $e_{me} \geq e_{max\text{-}Tot}/a_{me}$, $e_{max\text{-}Tot}$ being at least equal to the thickness of all of the superposed battery cells, and a protective film is affixed:
   either to each of the faces of the current collectors of the positive electrodes, by choosing a film material and thickness such that $e_{me} \geq e_{max}/a_{me}$, $e_{max}$ being at least equal to the thickness of a current collector;
   or to each of the faces of the intermediate negative electrodes, by choosing a film material and thickness such that $e_{me} \geq e_{max}/a_{me}$, $e_{max}$ being at least equal to the thickness of a negative electrode, taking into account the optional flow of the negative electrode material.

When the terminal electrodes are positive electrodes, a protective film is affixed to one of the faces of the current collector of each terminal electrode, by choosing a film material and thickness such that $e_{me} \geq e_{max\text{-}Tot}/a_{me}$, $e_{max\text{-}Tot}$ being at least equal to the thickness of all of the superposed battery cells, and a protective film is affixed:
   either to each of the faces of the current collectors of the positive electrodes, by choosing a film material and thickness such that $e_{me} \geq e_{max}/a_{me}$, $e_{max}$ being at least equal to the thickness of a current collector;
   or to each of the faces of the intermediate negative electrodes, by choosing a film material and thickness such that $e_{me} \geq e_{max}/a_{me}$, $e_{max}$ being at least equal to the thickness of a negative electrode, taking into account the optional flow of the negative electrode material.

Of course, the various cases may be combined, it being understood that an increase of the elasticity of the material forming a protective film and/or of the thickness of the protective film, and/or an increase of the number of protective films increases the operational safety of the battery. In this regard, it is desirable for the material used to form the protective films to have a certain degree of plasticity, so that it does not retract when it breaks after a maximum stretching. However, considering the confinement of the various materials, the risk of the protective film retracting after having reached its maximum stretching is low, even when the degree of plasticity is low.

Besides the protection against the penetration of conductive elements, the presence of protective films in the intermediate battery cells has the effect, during the crushing of the battery, of preventing direct contact between the current collectors of two adjacent electrodes or between the current collector of one electrode and the metallic film forming an adjacent electrode. When two electrodes draw closer together under the effect of an external pressure, the resistance of the short circuit that occurs is greatly increased due to the presence of the protective film and, consequently, the intensity of the short-circuit current is greatly decreased, which improves the operational safety of the battery.

When a film Fp is placed on the outer face of a terminal electrode, it advantageously consists of an elastomer material such as for example natural rubber, polyisoprene, polybutadiene, and butadiene-styrene (SBR) or butadiene-acrylonitrile (NBR) copolymers.

The presence of an outer protective film is particularly useful for a battery according to the invention, consisting of several groups of battery cells assembled in parallel, said groups themselves being assembled in series.

When the protective film Fp is an inner film (that is to say a film which is not placed on the outer face of a terminal electrode), it is in contact with an electrode. When the electrode is a film of a metallic material, the protective film Fp is placed between said film of metallic material and the film forming the electrolyte. When the electrode consists of a current collector bearing a film of electrode active material, the protective film Fp is placed between the current collector and the film of electrode active material.

An inner protective film consists of a material which has an electronic conduction C1 close to the electronic conductivity C2 of the electrode material with which it is in contact and much less than the electronic conductivity C3 of the current collector. The conductivities C1, C2 and C3 are preferably such that $0.5 \leq C1/C2 \leq 2$, and $C2 \leq C3/100$.

The material that constitutes the protective film is an elastic polymer material which does not disrupt the operation of the battery, said material being stable in the potential and temperature range in which the battery operates. Said polymer material essentially comprises at least one polymer, an electronic conduction agent and optionally one or more fillers.

The polymer may be a polyvinylidene fluoride (PVDF), a copolymer of vinylidene fluoride and hexafluoropropylene (PVDF-HFP), a styrene/butadiene (SBR) copolymer, a polyethylene oxide (POE), a copolymer of ethylene oxide, or a mixture of these polymers.

The electronic conduction agent may, for example, be carbon black, acetylene black, graphite optionally in expanded form, or carbon in the form of nanotubes.

An inner protective film consisting of a material that does not contain a lithium salt and in which the polymer is not a solvating polymer gives protection against short circuits and chemical protection. For this purpose, the polymer of the inner protective film is preferably chosen from polyvinylidene fluoride (PVDF), copolymers of vinylidene fluoride and hexafluoropropylene (PVDF-HFP) and styrene/butadiene (SBR) copolymers.

In a battery according to the invention, a positive electrode consists of a current collector bearing a film of electrode material on one of its faces or on both of its faces.

The current collector of the positive electrode may be a film of aluminum or of titanium, optionally coated with an anti-corrosion film. The anti-corrosion film may be a film of polymer material containing an electronically conductive filler. The polymer may be chosen from fluoropolymers (for example a polyvinylidene fluoride PVDF, or a polytetrafluoroethylene PTFE), and acrylic polymers. The electronically conductive filler may be chosen from carbon black, acetylene black, graphite, or carbon nanotubes. The thickness of the anti-corrosion film preferably represents at most 25% of the thickness of the metallic sheet forming the collector.

The positive electrode material comprises at least one positive electrode active material. It is preferably in the form of an electrode composite material containing in addition to the electrode active material at least one of the following constituents: ionic conduction agent, electronic conduction agent, binder.

The positive electrode active material may be chosen in particular from $Li_{1+x}V_3O_8$, $0<x<4$, $Li_xV_2O_5 \cdot nH_2O$, ($0<x<3$, $0<n<2$), $LiFePO_4$, hydrated or unhydrated iron phosphates and sulfates, hydrated or unhydrated vanadyl phosphates and sulfates [for example $VOSO_4$ and $Li_xVOPO_4 \cdot nH_2O$ ($0<n<3$, $0<x<2$)], $LiMn_2O_4$, $LiNiO_2$, compounds derived from $LiMn_2O_4$ obtained by substitution preferably with Al, Ni and Co, $LiMnO_2$, compounds derived from $LiMnO_2$ obtained by substitution preferably with Al, Ni and Co, $LiCoO_2$, compounds derived from $LiCoO_2$ obtained by substitution preferably with Al, Ti, Mg, Ni and Mn [for example $LiAl_xNi_yCo_{(1-x-y)}O_2$, ($x<0.5$, $y<1$)]. The phosphate $LiFePO_4$ is particularly preferred.

The electronic conduction agent of the positive electrode composite material may be carbon, in particular carbon black, acetylene black, graphite, carbon nanotubes, or a mixture of these compounds.

The ionic conduction agent of the positive electrode composite material is a lithium salt, preferably that of the electrolyte.

The binder of the positive electrode composite material is an organic binder that is electrochemically stable in the operating range of the positive electrode. By way of example, mention may be made of polyvinylidene fluoride homopolymers or an ethylene-propylene-diene copolymer. A polyvinylidene fluoride is particularly preferred. When the electrolyte is a polymer electrolyte, use may advantageously be made, as binder, of a polymer similar to that of the electrolyte.

A positive composite electrode may be produced by introducing into a volatile solvent, the active material and where appropriate the binder and/or the electronic conduction agent and/or the ionic conduction agent, by spreading the mixture thus obtained over a disk of metal used as collector, then by evaporating the solvent at high temperature under a nitrogen atmosphere. A positive electrode may also be produced by extrusion.

In a battery according to the invention, of the "lithium battery" type, the negative electrode may be a film of lithium, of an intermetallic lithium compound or of a lithium alloy chosen for example from the alloys β-LiAl, γ-LiAl, Li—Pb (for example $Li_7Pb_2$), Li—Cd—Pb, Li—Sn, Li—Sn—Cd, Li—Si, Li—Sn in various matrices, especially oxygen-containing matrices or metal (for example Cu, Ni, Fe, Fe—C) matrices, or Li—Al—Mn. The thickness of the film is preferably between 10 and 100 μm.

When the battery comprises several battery cells in which the negative electrodes consist of films of metallic material, in particular of lithium, it is essential that a protective film is interposed between each positive electrode current collector and the nearest film of metallic material.

In a lithium metal battery, LiTFSI is particularly preferred as lithium salt for the electrolyte.

In a battery according to the invention of the "lithium-ion battery" type, the negative electrode consists of a current collector bearing a film of negative electrode material.

The current collector may consist of a copper film, a nickel film, a titanium film or a steel film.

The negative electrode material comprises at least one negative electrode active material. It is preferably in the form of a composite material which contains, in addition to the negative electrode active material, at least one of the following constituents: ionic conduction agent, electronic conduction agent, binder.

The negative electrode active material is a material capable of reversibly inserting lithium ions at low redox potential, said material being lithiated during a preliminary step. The insertion material may be chosen from natural or synthetic carbon-based materials. These carbon-based materials may, for example, be a petroleum coke, a graphite, a graphite whisker, a carbon fiber, a mesocarbon microbead, a pitch coke or a needle coke. The insertion material may also be chosen from oxides such as, for example, $Li_xMoO_2$, $Li_xWO_2$, $Li_xFe_2O_3$, $Li_4Ti_5O_{12}$, $Li_xTiO_2$ or from sulfides such as, for example, $Li_9Mo_6S_6$ and $LiTiS_2$ or from oxysulfides. Use may also be made of compounds that make it possible to reversibly store lithium at low potential, such as amorphous vanadates (for example $Li_xNiVO_4$), nitrides (for example $Li_{2.6-x}Co_{0.4}N$, $Li_{2+x}FeN_2$, $Li_{7+x}MnN_4$), phosphides (for example $Li_{9-x}VP_4$), arsenides (for example $Li_{9-x}VAs_4$) and oxides that undergo reversible decomposition (for example CoO, CuO, $Cu_2O$).

The binder of the negative electrode composite material is an organic binder that is electrochemically stable in the operating range of the negative electrode. By way of example, mention may be made of polyvinylidene fluoride homopolymers or an ethylene-propylene-diene copolymer. A polyvinylidene fluoride is particularly preferred. When the electrolyte is a polymer electrolyte, use may advantageously be made, as binder, of a polymer similar to that of the electrolyte.

A negative composite electrode may be produced by introducing the carbon-based compound into a solution of the binder in an aprotic polar solvent, by spreading the mixture obtained on a metal disk serving as collector, then by evaporating the solvent at high temperature under a nitrogen atmosphere. A negative electrode may also be produced by extrusion.

The electronic conduction agent in the negative electrode material may be carbon, in particular carbon black, acetylene black, graphite, carbon nanotubes, or a mixture of these compounds.

The ionic conduction agent of the negative electrode composite material is a lithium salt, preferably that of the electrolyte.

In a lithium-ion battery, $LiPF_6$ is particularly preferred as lithium salt for the electrolyte.

The electrolyte of a multilayer battery according to the invention comprises at least one lithium salt in solution in a solvent. The salt may especially be chosen from $LiClO_4$, $LiPF_6$, $LiAsF_6$, $LiBF_4$, $LiCF_3SO_3$, $LiSbF_6$, $LiBC_4O_8$, $(FSO_2)_2NLi$, lithium bisperfluoroalkyl sulfonimides (especially lithium bis(trifluoromethyl)sulfonamide LiTFSI), and lithium bis- or tris(perfluoroalkyl)sulfonylmethides.

The solvent may be a solvating liquid, a solid solvating polymer optionally plasticized by addition of a liquid, or a gel polymer.

When the solvent of the electrolyte is a liquid, the electrolyte impregnates a separator placed between the electrodes. The liquid solvent may consist of one or more aprotic polar compounds chosen from linear or cyclic carbonates, linear or cyclic ethers, linear or cyclic esters, linear or cyclic sulfones, sulfamides and nitriles. The solvent preferably consists of at least two carbonates chosen from ethylene carbonate (EC), propylene carbonate, dimethyl carbonate, (DMC), diethyl carbonate and methyl ethyl carbonate. A battery having an electrolyte containing an aprotic polar solvent generally operates in a temperature range from −20° C. to 60° C.

When the electrolyte contains a solvating polymer solvent, said polymer may be chosen from polyethers having a linear, comb or block structure, that may or may not form a network, based on polyethylene oxide; copolymers containing the ethylene oxide or propylene oxide or allyl glycidyl ether unit; polyphosphazines; crosslinked networks based on polyethylene glycol crosslinked by isocyanates; copolymers of oxyethylene and epichlorohydrin as described in FR-2 770 034; and the networks obtained by polycondensation and that bear groups which enable the incorporation of crosslinkable groups. Mention may also be made of block copolymers in which certain blocks bear functions which have redox properties. A battery having an electrolyte that contains a polymer solvent generally functions in a temperature range from 50° C. to 120° C.

The solvent of the electrolyte may also be a mixture of an aprotic polar liquid compound chosen from the aforementioned aprotic polar compounds and of a solvating polymer. It may comprise from 2% to 98% by volume of liquid solvent, depending on whether an electrolyte plasticized with a low content of aprotic polar compound or an electrolyte gelled with a high content of aprotic polar compound is desired. When the polymer solvent of the electrolyte bears ionic functions, the lithium salt is optional.

The solvent of the electrolyte may also be a mixture of an aprotic polar compound as defined above or of a solvating polymer as defined above, and of a non-solvating polar polymer comprising units that contain at least one heteroatom chosen from sulfur, oxygen, nitrogen and fluorine. Such a non-solvating polymer may be chosen from homopolymers and copolymers of acrylonitrile, homopolymers and copolymers of vinylidene fluoride, and homopolymers and copolymers of N-vinylpyrrolidone. The non-solvating polymer may also be a polymer that bears ionic substituents, and especially a polyperfluoroether sulfonate salt (such as an aforementioned Nafion® for example) or a polystyrene sulfonate salt.

In another embodiment, the electrolyte of the battery of the present invention may be an inorganic conductive solid, chosen from the compounds customarily denoted by Lisicon, that is to say solid solutions $Li_4XO_4$—$Li_3YO_4$ (X=Si or Ge or Ti; Y=P or As or V), $Li_4XO_4$—$Li_2AO_4$ (X=Si or Ge or Ti; A=Mo or S), $Li_4XO_4$—$LiZO_2$ (X=Si or Ge or Ti; Z=Al or Ga or Cr), $Li_4XO_4$—$Li_2BXO_4$ (X=Si or Ge Ti; or B=Ca or Zn), $LiO_2$—$GeO_2$—$P_2O_5$, $LiO_2$—$SiO_2$—$P_2O_5$, $LiO_2$—$B_2O_3$—$Li_2SO_4$, LiF—$Li_2S$—$P_2S_5$, $Li_2O$—$GeO_2$—$V_2O_5$ or $LiO_2$—$P_2O_5$—PON. A lithium battery comprising such an electrolyte functions in a very broad temperature range, of the order of −20° C. to 100° C.

Figure 1:
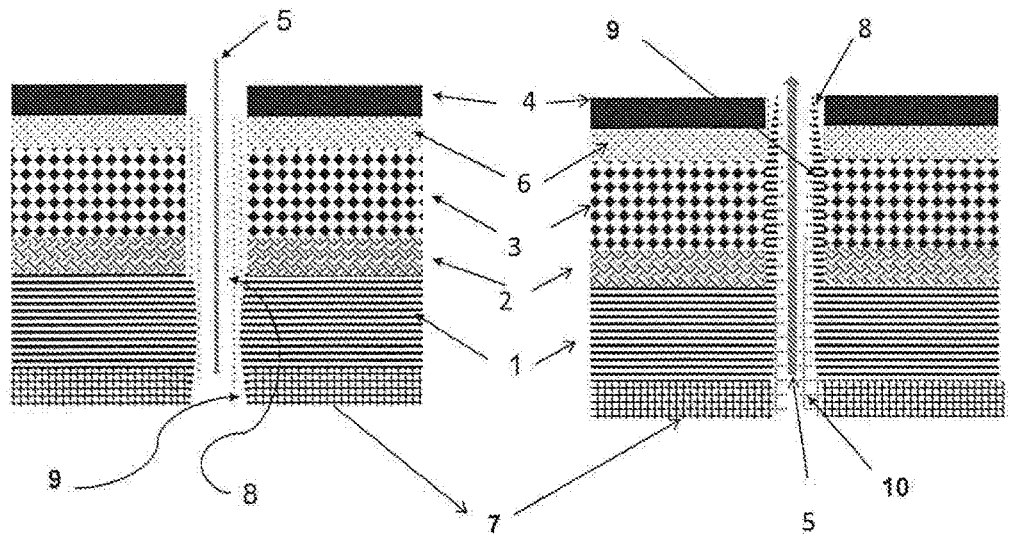
FIGS. 1 to 5 represent, by way of example, some particular cases for the configuration of batteries according to the invention.

In the various figures, the same references denote the same components. The relation between the references and the components is as follows:
1 lithium film constituting a negative electrode
1' current collector of a negative electrode
1" film of negative electrode active material
2 electrolyte film
3 film of positive electrode active material
4 current collector of positive electrode
5 nail
6 protective film for a positive electrode
6' protective film for a negative electrode
7 outer protective film
8 sheathing produced by stretching of a film 6
8' sheathing produced by stretching of a film 6'
9 sheathing produced by flow of a lithium film 1
10 sheathing formed by stretching of a film 7

11 electrical contact between a conductive penetrating element and a current collector.

DETAILED DESCRIPTION

FIG. 1 represents a schematic view of a battery cell comprising an inner protective film 6 and an outer protective film 7. In this battery cell, the negative electrode is a film of lithium metal 1 which bears on its outer face a protective film 7. The positive electrode comprises a current collector 4 bearing a film of electrode active material 3, and also a protective film 6 placed between the collector and the film of active material. The electrolyte 2 is placed between the electrodes. FIGS. 1a and 1b schematically represent the effect of inserting a nail 5 from the positive electrode side (FIG. 1a) and from the negative electrode side (FIG. 1b). FIG. 1a demonstrates the stretching of the protective film 6 which forms a sheathing 8 of the nail 5 to beyond the negative electrode 1, and the flow of the lithium film 1 which forms a sheathing 9. FIG. 1b shows the stretching of the protective film 7 which forms a sheathing 10 of the nail, the stretching of the lithium film 1 which itself forms a sheathing 9 along the nail, from which it is insulated by the sheathing 10, and the stretching of the protective film 6 which forms a sheathing 8 around the nail (insulated from the lithium sheathing by the sheathing 10) to beyond the current collector 4.

Figure 2:
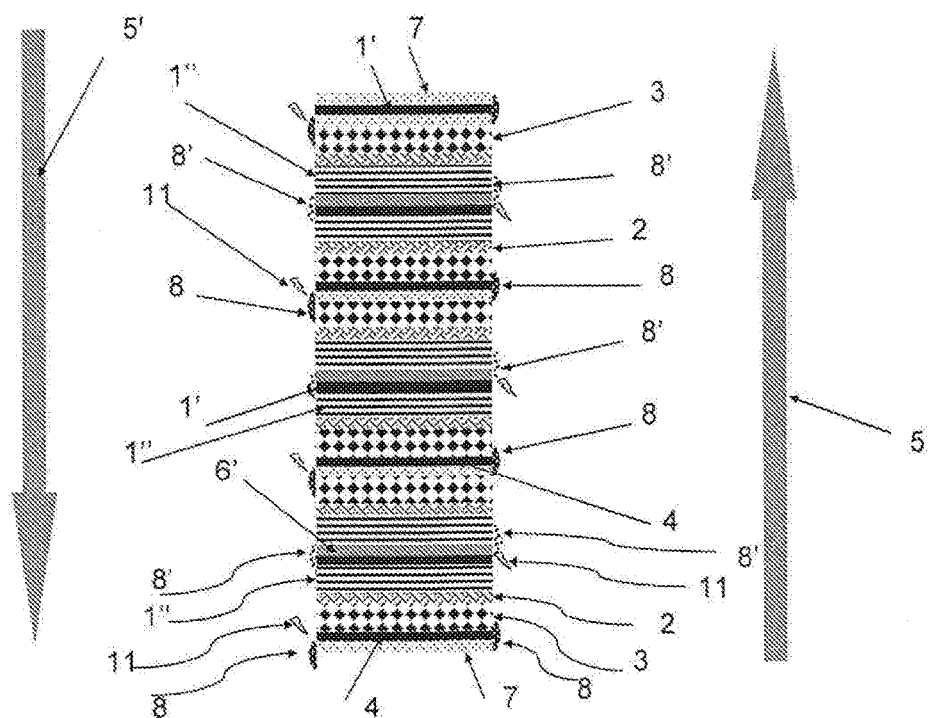

FIG. 2 represents the diagram of a lithium-ion battery corresponding to the second embodiment of a minimal protection. The battery comprises several battery cells. The two terminal electrodes are positive electrodes each comprising a current collector 4 bearing an outer protective film 7 on its outer face and a film of material 3 on its inner face. The non-terminal positive electrodes each comprise a current collector 4 bearing a film of active material 3 on each of their faces. Each of the negative electrodes consists of a current collector 1' bearing a film 1" of active material on each of its faces. Thus, an intermediate battery cell shares its current collectors with the two battery cells that are adjacent thereto. The films 2 represent the electrolyte films.

The positive current collectors 4 bear on their lower likes a protective film 6. The negative current collectors 1' bear on their upper faces a protective film 6.

The elements 5 and 5' are the penetrating elements represented in the figure simply for indicating a direction of penetration.

During the penetration of a pointed element in the direction indicated by the element 5, the protective films 6 are stretched and form a sheathing 8 over the edge of the positive current collectors 4. The protective films 6' are stretched and form a sheathing at least over one portion of the films of negative active material 1", leaving free the edge of the negative current collectors 1'. There is therefore contact between the penetrating element 5 and the negative current collectors, but no contact between current collectors of opposite sign, since the positive current collectors are protected.

During the penetration of a pointed element in the direction indicated by the element 5', the protective films 6' are stretched and form a sheathing 8' over the edge of the negative current collectors 1'. The protective films 6 are stretched and form a sheathing at least over one portion of the films of positive active material 3, leaving free the edge of the positive current collectors 4. There is therefore contact between the penetrating element 5' and the positive current collectors, but no contact between the current collectors of opposite sign, since the negative current collectors are protected.

Figure 3:
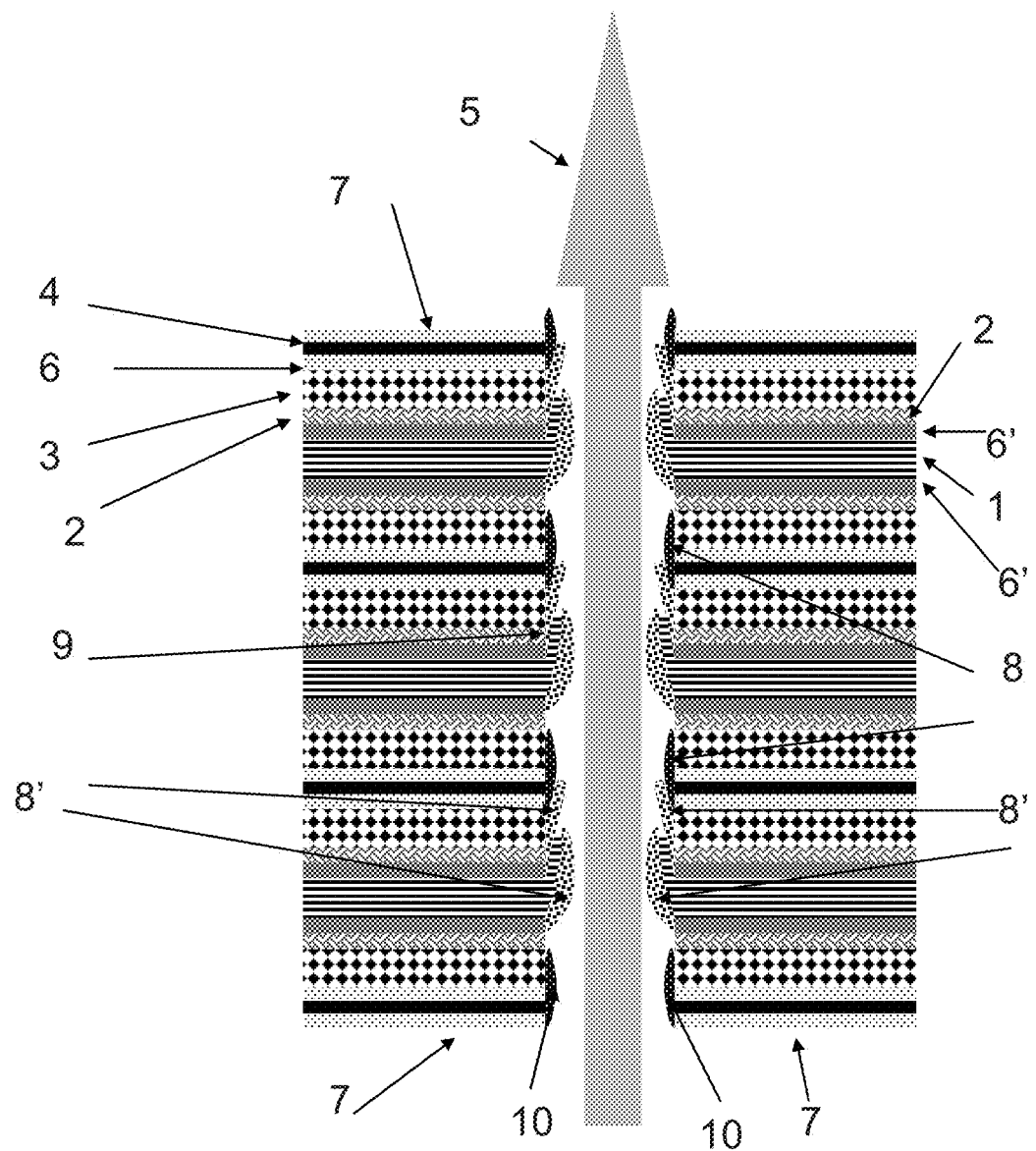

FIG. 3 represents a schematic view of a battery comprising several battery cells, in which the negative electrodes 1 are lithium electrodes, the terminal electrodes are positive electrodes, a protective film 6 is placed between each positive electrode current collector 4 and the film(s) of active material 3 that it bears. A protective film 6' is placed on each face of the negative electrodes. FIG. 3 illustrates the effect of inserting a nail 5, especially the flow of the lithium film 1 which forms a sheathing 9 along the nail 5, the stretching of the film 6' which forms a sheathing 8' and the stretching of the protective film 6 which forms a sheathing 8 around the nail 5 to beyond the current collector 4.

Figure 4:
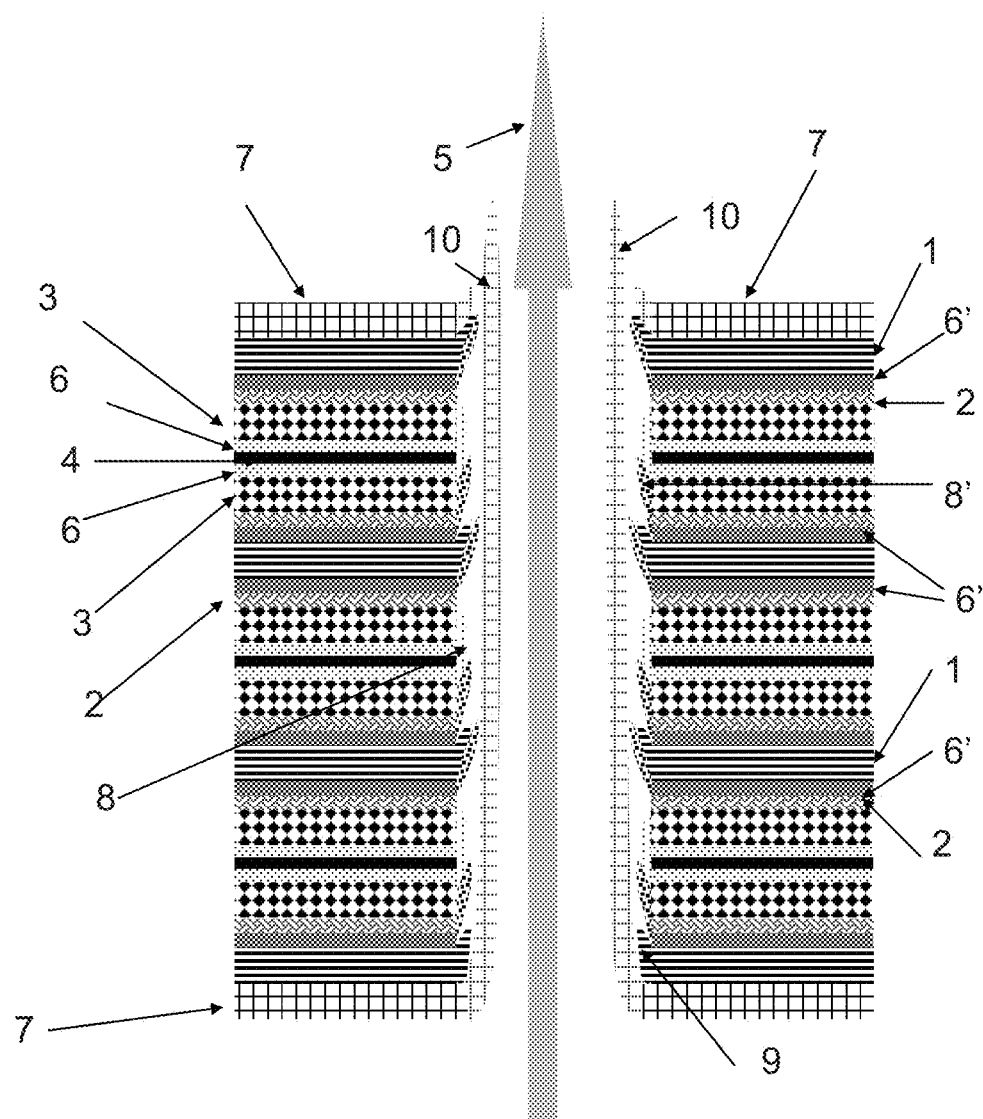

FIG. 4 represents a schematic view of a battery comprising several battery cells, in which the negative electrodes 1 are lithium electrodes, the terminal electrodes are negative electrodes, a protective film 6 is placed between each positive electrode current collector 4 and the film(s) of active material 3 that it bears. A protective film 7 is placed on the outer face of each of the terminal electrodes. A protective film 6' is placed on each face of each of the non-terminal negative electrodes. FIG. 4 illustrates the effect of inserting a nail 5, especially the stretching of the film 7 which forms a sheathing 10 around the nail, the flow of the lithium film 1 which forms a sheathing 9 along the nail 5 insulated by the sheathing 10, the stretching of the film 6' which forms a sheathing 8' around the nail in order to prevent contact of the lithium with the positive active material, and the stretching of the protective film 6 which forms a sheathing 8 around the nail 5 to beyond the current collector 4.

Figure 5:
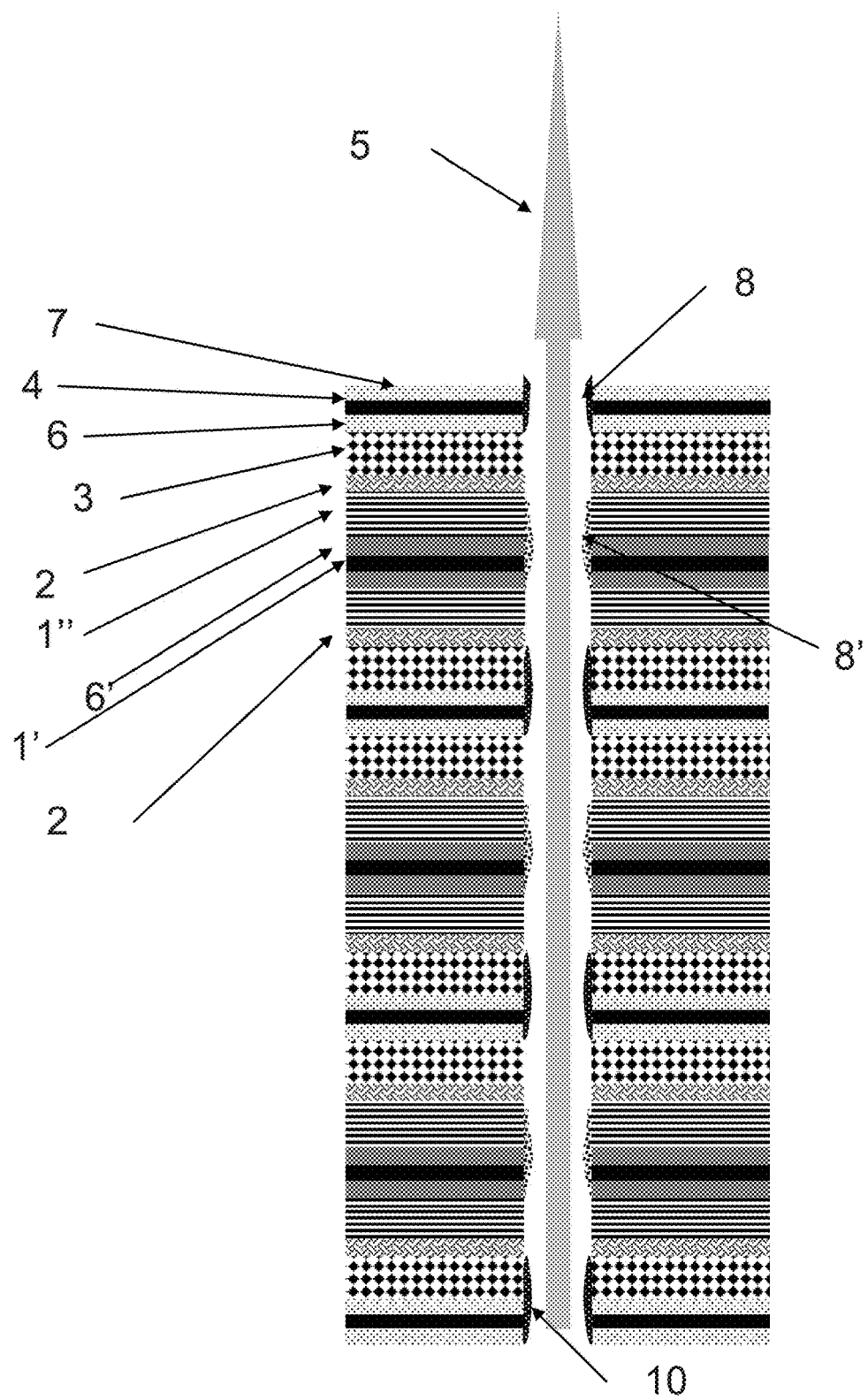

FIG. 5 represents a schematic view of a battery comprising several battery cells in which the negative electrodes consist of a current collector 1' and a film 1" of active material that are separated by a protective film 6', and the positive electrodes consist of a current collector 4 bearing a film of electrode active material 3. An electrolyte film 2 is placed between the electrodes. A protective film 7 is placed on the outer face of each of the terminal electrodes. A protective film 6' is placed on each face of each of the non-terminal negative electrodes. FIG. 5 illustrates the effect of inserting a nail 5, especially the stretching of the film 7 which forms a sheathing 10 around the nail, the stretching of each film 6' which forms a sheathing 8' around the nail, and the stretching of each protective film 6 which forms a sheathing 8.

EXAMPLES

The present invention is described in greater detail by the following examples, to which it is not however limited.

The following products were used:
polyethylene oxide PEO, sold by Dow Chemical under the reference WSRN750;
copolymer of ethylene oxide and propylene oxide (EO-PO 90/10) sold by Zeon under the reference ZSN-8100;
PVDF/HFP copolymer sold by Solvay, under the reference 21510;
PVDF polymer sold by Solvay under the reference 6020;
LiTFSI sold by the company 3M under the reference HQ115;
carbon black sold by Akzo Nobel under the reference Ketjenblack EC600;
$LiFePO_4$ sold by Phostech Lithium Inc. under the reference P1;

SBR polymer sold by Zeon under the name Nipol SBR;
acetylene black sold by SN2A under the name Y200;
carbon nanotubes sold by Arkema under the name Graphistrength.

Example 1

Elastic Film Based on PVDF-HFP/Carbon Black

This example relates to a multilayer battery comprising a battery cell which has a structure in accordance with that represented in FIG. 1 (with the exception of the outer films 7), and the various constituents are as follows:

Negative electrode 1:
  lithium film, thickness: 51 μm.
Electrolyte 2:
  20 μm film consisting of a mixture of 49% of PEO polymer, 11% of LiTFSI and 40% of PVDF/HFP copolymer (% by weight).
Electrode active material 3:
  48 μm film consisting of a mixture of 74% of LiFePO$_4$ 1.5% of carbon black, 19.4% of PEO polymer and 5.1% of LiTFSI.
Protective film 6:
  17 μm film consisting of a mixture of PVDF/HFP copolymer, PEO polymer, LiTFSI and carbon black, in the weight proportions 37.3%, 42.5%, 13.5% and 6.66%.
Current collector 4:
  13 μm aluminum film coated on each side with a 2 μm anti-corrosion layer (polymer+carbon), i.e. in total a thickness of 17 μm, sold by Exopack under the name Product 2651.

The elastic film, which has a thickness of 17 μm, has a resistivity of 15 Ω·cm and an elongation at break of 100%, measured on a tensile testing machine.

5 batteries were produced according to this diagram, and also 5 similar batteries but without the elastic film. Perforation tests were carried out on each of the batteries by driving in, perpendicular to the surface of the lithium film, a nail, the length of which is at least equal to the thickness of the battery.

In the 5 batteries incorporating a PTC elastic film, neither fire nor short circuit were observed. In the 5 batteries without a PTC film, a short circuit was observed in each battery and a fire in 3 out of 5 batteries.

Example 2

Elastic Film Based on SBR

This example relates to a multilayer battery comprising a battery cell which also has a structure similar to that of the battery from example 1 and in which the various components are the following:

Negative electrode 1:
  lithium film, thickness: 51 μm.
Electrolyte 2:
  20 μm film consisting of a mixture of 49% of PEO polymer, 11% of LiTFSI and 40% of PVDF/HFP copolymer (% by weight).
Electrode active material 3:
  48 μm film consisting of a mixture of 74% of LiFePO$_4$ 1.5% of carbon black, 19.4% of PEO polymer and 5.1% of LiTFSI.
Elastic film 6:
  34 μm film consisting of a mixture of SBR and of acetylene black in a weight ratio of 70/30.
Current collector 4:
  13 μm aluminum film coated on each side with a 2 μm anti-corrosion layer (polymer+carbon), i.e. in total a thickness of 17 μm.

The resistivity of the elastic film is 10 Ω·cm. Its elongation at break is 50% measured on a tensile testing machine.

5 batteries according to this diagram were produced, and also 5 similar batteries but without the elastic film. Perforation tests were carried out on each of the batteries in the same way as in example 1.

In the 5 batteries incorporating a PTC elastic film, neither fire nor short circuit were observed. In the 5 batteries without a PTC film, a short circuit was observed in each battery and a fire in 3 out of 5 batteries.

Example 3

Elastic Film Based on PVDF

A multilayer battery was produced comprising a battery cell which has a structure similar to that of the battery from example 1 and in which the various components are the following:

Negative electrode 1:
  lithium film, thickness: 51 μm.
Electrolyte 2:
  20 μm film consisting of a mixture of 49% of PEO polymer, 11% of LiTFSI and 40% of PVDF/HFP copolymer (% by weight).
Electrode active material 3:
  48 μm film consisting of a mixture of 74% of LiFePO$_4$ 1.5% of carbon black, 19.4% of PEO polymer and 5.1% of LiTFSI.
Elastic film 6:
  16 μm film consisting of a mixture of PVDF polymer (94% by weight) and of carbon nanotubes (6% by weight).
Current collector 4:
  13 μm aluminum film coated on each side with a 2 μm anti-corrosion layer (polymer+carbon), i.e. in total a thickness of 17 μm.

The resistivity of the elastic film is 17 Ω·cm. Its elongation at break is 105% measured on a tensile testing machine.

5 batteries according to this diagram were produced, and also 5 similar batteries but without the elastic film. Perforation tests were carried out on each of the batteries in the same way as in example 1.

In the 5 batteries incorporating a PTC elastic film, neither fire nor short circuit were observed. In the 5 batteries without a PTC film, a short circuit was observed in each battery and a fire in 3 out of 5 batteries.

Example 4

Elastic Film Based on PVDF-HFP

This example relates to a multilayer battery comprising a battery cell which has a structure similar to that of the battery from example 1 and in which the various components are the following:

Negative electrode 1:
  lithium film, thickness: 51 μm.
Electrolyte 2:
  20 μm film consisting of a mixture of 49% of PEO polymer, 11% of LiTFSI and 40% of PVDF/HFP copolymer (% by weight).

Electrode active material 3:
    48 μm film consisting of a mixture of 74% of LiFePO$_4$ 1.5% of carbon black, 19.4% of PEO polymer and 5.1% of LiTFSI.
Elastic film 6:
    32 μm film consisting of a mixture of PVDF-HFP copolymer (75% by weight) and of exfoliated graphite (25% by weight).
Current collector 4:
    13 μm aluminum film coated on each side with a 2 μm anti-corrosion layer (polymer+carbon), i.e. in total a thickness of 17 μm.
    The resistivity of the elastic film is 44 Ω·cm. Its elongation at break is 54% measured on a tensile testing machine.
    5 batteries according to this diagram were produced, and also 5 similar batteries but without the elastic film. Perforation tests were carried out on each of the batteries in the same way as in example 1.
    In the 5 batteries incorporating a PTC elastic film, neither fire nor short circuit were observed. In the 5 batteries without a PTC film, a short circuit was observed in each battery and a fire in 3 out of 5 batteries.

Example 5

Elastic Film at the Negative Electrode
    This example relates to a multilayer battery comprising a battery cell which has the following composition:
Current collector 1':
    copper film, thickness: 17 μm.
Elastic film 6':
    32 μm film consisting of a mixture of PVDF-HFP copolymer (75% by weight) and of exfoliated graphite (25% by weight).
Negative electrode active material 1'':
    50 μm film consisting of a mixture of PVDF-HFP copolymer (8% by weight) and of graphite (92% by weight).
Electrolyte 2:
    20 μm film consisting of a mixture of 60% [EC/DMC (1/3)+LiTFSI 1 M]+40% PVDF/HFP.
Electrode active material 3:
    100 μm film, consisting of a mixture of 85% of LiCoO$_2$, 5% of carbon black and 10% of PVDF/HFP polymer.
Current collector 4:
    17 μm aluminum film.
    The resistivity of the elastic film is 44 Ω·cm. Its elongation at break is 54% measured on a tensile testing machine.
    5 batteries according to this diagram were produced, and also 5 similar batteries but without the elastic film. Perforation tests were carried out on each of the batteries in the same way as in example 1.
    In the 5 batteries incorporating a PTC elastic film, neither fire nor short circuit were observed. In the 5 batteries without a PTC film, a short circuit and a fire were observed.

Example 6

Elastic Film at the Positive Electrode
    This example relates to a multilayer battery comprising a battery cell which has the following composition:
Current collector 1':
    copper film, thickness: 17 μm.
Negative electrode active material 1'':
    50 μm film consisting of a mixture of PVDF-HFP copolymer (8% by weight) and of graphite (92% by weight).
Electrolyte 2:
    20 μm film consisting of a mixture of 60% [EC/DMC (1/3)+LiTFSI 1 M]+40% PVDF/HFP.
Electrode active material 3:
    100 μm film, consisting of a mixture of 85% of LiCoO$_2$, 5% of carbon black and 10% of PVDF/HFP polymer.
Elastic film 6:
    32 μm film consisting of a mixture of PVDF-HFP copolymer (75% by weight) and of exfoliated graphite (25% by weight).
Current collector 4:
    17 μm aluminum film.
    The resistivity of the elastic film is 44 Ω·cm. Its elongation at break is 54% measured on a tensile testing machine.
    5 batteries according to this diagram were produced, and also 5 similar batteries but without the elastic film. Perforation tests were carried out on each of the batteries in the same way as in example 1.
    In the 5 batteries incorporating a PTC elastic film, neither fire nor any short circuit were observed in the 5 batteries. In each of the 5 batteries without a PTC film, a short circuit and a fire were observed.

The invention claimed is:
1. A lithium or lithium ion battery comprising:
    a battery cell PEN which has a film of an electrolyte E containing a lithium salt between a film P forming a positive electrode and a film N forming a negative electrode, or
    a stack of battery cells PEN, said stack comprising two terminal battery cells between which one or more intermediate battery cells are optionally placed,
    each of the positive electrodes has a current collector forming a connection layer, bearing a film of positive electrode material capable of reversibly inserting lithium ions, and
    each of the negative electrodes has a current collector forming a connection layer, bearing a film of negative electrode material capable of reversibly inserting lithium ions or has a film of a metallic material forming a connection layer selected from the group consisting of lithium, lithium alloys and intermetallic lithium compounds,
    wherein said battery has at least two protective films Fp made of an elastic material having an elongation at break denoted by $a_{me}$ and a thickness denoted by $e_{me}$, at least one of the electrodes of the battery cell or of each terminal battery cell being in contact with a protective film Fp made of an elastic material,
    wherein at least one of said protective films Fp is in contact with a connection layer of an electrode, said connection layer having a thickness emax, said protective film having a thickness such that $e_{me} > e_{max}/a_{me}$, so that:
    when said electrode with a connection layer that is in contact with the protective film Fp is a current collector bearing a film of electrode material, said protective film Fp is placed between the current collector and the film of electrode material, and
    when said electrode with a connection layer that is in contact with the protective film Fp is a film of a metallic material selected from the group consisting of lithium, lithium alloys and intermetallic lithium compounds, said protective film Fp is applied to said film of metallic material.
2. The battery as claimed in claim 1, wherein the electrolyte is a solid electrolyte.

3. The battery as claimed in claim 1, wherein said battery has a single battery cell PEN and that at least one of the faces of each electrode is in contact with said protective film Fp.

4. The battery as claimed in claim 1, wherein said battery has groups of battery cells assembled in parallel, said groups of battery cells assembled in parallel being assembled in series.

5. The battery as claimed in claim 1, wherein said battery has multiple battery cells PEN, which are stacked so that:
   the positive electrodes of two adjacent battery cells are combined as one and are formed by a single current collector bearing a film of positive electrode active material on each of its faces;
   the negative electrodes of two adjacent battery cells are combined as one and are formed either by a single current collector bearing a film of negative electrode active material on each of its faces; or by a film of a metallic material selected from the lithium, lithium alloys and intermetallic lithium compounds;
   a positive terminal electrode includes a current collector bearing a positive electrode active material on one of its faces; and
   a negative terminal electrode includes either one of a current collector bearing a negative electrode active material on one of its faces, or of a film of a metallic material chosen from lithium, lithium alloys and intermetallic lithium compounds.

6. The battery as claimed in claim 5, wherein the negative electrodes have a current collector bearing a negative electrode active material, wherein:
   said battery has a protective film on each face of the current collector of each electrode of a given sign,
   said protective film has a thickness $e_{me}$ such that $e_{me} \geq e_{max}/a_{me}$, $e_{max}$ being at least equal to the thickness of a current collector,
   a protective film is placed on the upstream face of the positive current collectors, and on the downstream face of the negative current collectors, "upstream" and "downstream" being understood with respect to the direction of penetration of a conductive pointed element.

7. The battery as claimed in claim 5, wherein the negative electrodes have a current collector bearing a negative electrode active material, wherein a protective film is affixed to at least one of the faces of the current collector of each terminal electrode, said film having a thickness $e_{me}$ such that $e_{me} \geq e_{max-Tot}/a_{me}$, $e_{max-Tot}$ being at least equal to the thickness of all of the superposed battery cells.

8. The battery as claimed in claim 5, wherein the negative electrodes have a current collector bearing a negative electrode active material, wherein a protective film is affixed to each face of the current collector of each electrode of a given sign, said film having a thickness such that $e_{me} \geq e_{max-Tot}/a_{me}$, $e_{max-Tot}$ being at least equal to the thickness of a battery cell.

9. The battery as claimed in claim 5, wherein the negative electrodes have a current collector bearing a negative electrode active material, wherein a protective film is placed on the upstream face of the positive current collectors, and on the downstream face of the negative current collectors, "upstream" and "downstream" being understood with respect to the direction of penetration of a conductive pointed element, said film having a thickness $e_{me}$ such that $e_{me} \geq e_{max-Tot}/a_{me}$, $e_{max-Tot}$ being at least equal to the thickness of a battery cell.

10. The battery as claimed in claim 5, wherein the negative electrodes have a film of metallic material, wherein a protective film is placed on each face of the current collector of each positive electrode, said film having a thickness $e_{me}$ such that $e_{me} \geq e_{max}/a_{me}$, $e_{max}$ being at least equal to the thickness of a current collector of the positive electrode.

11. The battery as claimed in claim 5, wherein the negative electrodes have a film of metallic material, wherein a protective film is placed on each face of each negative electrode, said film having a thickness $e_{me}$ such that $e_{me} \geq e_{max}/a_{me}$, $e_{max}$ being at least equal to the thickness of the negative electrode taking into account the stretching of the material forming this negative electrode, or to the thickness of the electrolyte and of the positive electrode placed after the protective film.

12. The battery as claimed in claim 5, wherein the negative electrodes have a film of metallic material, wherein a protective film is placed on the upstream face of the positive current collectors, and on the downstream face of the negative current collectors, "upstream" and "downstream" being understood with respect to the direction of penetration of a conductive pointed element, said film having a thickness $e_{me}$ such that $e_{me} \geq e_{max}/a_{me}$, $e_{max}$ being at least equal to the largest thickness among the thickness of a current collector and the thickness of the negative electrode taking into account the stretching thereof.

13. The battery as claimed in claim 5, wherein the negative electrodes have a film of metallic material, and the terminal electrodes are negative electrodes, wherein a protective film is affixed to the outer face of each terminal electrode, said film having a thickness $e_{me}$ such that $e_{me} \geq e_{max-Tot}/a_{me}$, $e_{max-Tot}$ being at least equal to the thickness of all of the superposed battery cells, and a protective film is affixed:
   Either one of to each of the faces of the current collectors of the positive electrodes, by choosing a film material and thickness such that $e_{me} \geq e_{max}/a_{me}$, $e_{max}$ being at least equal to the thickness of a current collector;
   or to each of the faces of the intermediate negative electrodes, by choosing a film material and thickness such that $e_{me} \geq e_{max}/a_{me}$, $e_{max}$ being at least equal to the thickness of a negative electrode, taking into account the possible stretching of the negative electrode material.

14. The battery as claimed in claim 5, wherein the negative electrodes have a film of metallic material, and the terminal electrodes are positive electrodes, wherein a protective film is affixed to one of the faces of the current collector of each terminal electrode, the thickness $e_{me}$ of said film being such that $e_{me} \geq e_{max-Tot}/a_{me}$, $e_{max-Tot}$ being at least equal to the thickness of all of the superposed battery cells, and a protective film is affixed:
   Either each of the faces of the current collectors of the positive electrodes, by choosing a film material and thickness such that $e_{me} \geq e_{max}/a_{me}$, $e_{max}$ being at least equal to the thickness of a current collector;
   or to each of the faces of the intermediate negative electrodes, by choosing a film material and thickness such that $e_{me} \geq e_{max}/a_{me}$, $e_{max}$ being at least equal to the thickness of a negative electrode, taking into account the possible stretching of the negative electrode material.

15. The battery as claimed in claim 1, wherein a protective film Fp placed on the outer face of a terminal electrode is made of an elastomer material and a protective film Fp not placed on the outer face of a terminal electrode is an elastic polymer material which comprises at least one polymer, an electronic conduction agent and optionally one or more fillers.

16. The battery as claimed in claim 15, wherein the protective film not placed on the outer face of a terminal electrode is made of a material which has an electronic conduction C1 close to the electronic conductivity C2 of the electrode material with which it is in contact and much less than the electronic conductivity C3 of the current collector, the conductivities C1, C2 and C3 being such that $0.5 \leq C1/C2 \leq 2$, and $C2 \leq C3/100$.

17. The battery as claimed in claim 15, wherein the polymer is selected from the group consisting of a polyvinylidene fluoride (PVDF), a copolymer of vinylidene fluoride and hexafluoropropylene (PVDF-HFP), a styrene/butadiene (SBR) copolymer, a polyethylene oxide (PEO), and a mixture of these polymers.

18. The battery as claimed in claim 15, wherein the electronic conduction agent is selected from the group consisting of carbon black, acetylene black, graphite optionally in expanded form, or carbon in the form of nanotubes.

19. The battery as claimed in claim 15, wherein the material forming the protective film is an elastic polymer material which essentially comprises at least one non-solvating polymer selected from the group consisting of polyvinylidene fluoride (PVDF), copolymers of vinylidene fluoride and hexafluoropropylene (PVDF-HFP), styrene/butadiene (SBR) copolymers and which is free of lithium salt.

20. The battery as claimed in claim 15, wherein the elastomer material is selected from the group consisting of natural rubber, polyisoprene, polybutadiene, and butadiene-styrene (SBR) and butadiene-acrylonitrile (NBR) copolymers.

* * * * *